US010802852B1

(12) United States Patent
Wilmot et al.

(10) Patent No.: US 10,802,852 B1
(45) Date of Patent: Oct. 13, 2020

(54) METHOD FOR INTERACTIVE EMBEDDED SOFTWARE DEBUGGING THROUGH THE CONTROL OF SIMULATION TRACING COMPONENTS

(71) Applicant: Cadence Design Systems, Inc., San Jose, CA (US)

(72) Inventors: Andrew R. Wilmot, Carlisle, MA (US); Neeti Khullar Bhatnagar, San Jose, CA (US); Qizhang Chao, Palo Alto, CA (US); George Franklin Frazier, Lawrence, KS (US); Yevgen Ryazanov, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 491 days.

(21) Appl. No.: 14/792,849

(22) Filed: Jul. 7, 2015

(51) Int. Cl.
*G06F 9/455* (2018.01)
*G06F 11/30* (2006.01)
*G06F 117/08* (2020.01)

(52) U.S. Cl.
CPC ............ *G06F 9/455* (2013.01); *G06F 11/302* (2013.01); *G06F 2117/08* (2020.01)

(58) Field of Classification Search
CPC ..... G06F 9/455; G06F 2217/86; G06F 11/302
See application file for complete search history.

(56) References Cited

U.S. PATENT DOCUMENTS

| 5,168,554 | A | * | 12/1992 | Luke ...................... G06F 11/323 |
| | | | | 714/E11.181 |
| 5,548,717 | A | | 8/1996 | Wooldridge et al. |
| 5,809,283 | A | | 9/1998 | Vaidyanathan et al. |
| 5,815,714 | A | | 9/1998 | Shridhar et al. |

(Continued)

OTHER PUBLICATIONS

Harel et al. "Statemate: A Development of 16. No. 4. Apr. 1990 Working Environment for the Complex Reactive Systems" IEEE Transactions on Software Engineering, vol. 16, No. 4 [retrieved on Apr. 13, 2019]. Retrieved from <https://ieeexplore.ieee.org/document/54292/> (Year: 1990).*

(Continued)

*Primary Examiner* — Rehana Perveen
*Assistant Examiner* — Alfred H B Wechselberger
(74) *Attorney, Agent, or Firm* — Tarolli, Sundheim, Covell & Tummino LLP (57) ABSTRACT

According to an embodiment, a system and method are provided for supporting interactive debugging of embedded software (ESW) on a simulation platform. A processor model within the simulated system will support a register and memory tracing sub-module. Simulator and emulator breakpoints will be used with the modeled objects within the tracing sub-module. For example, a simulator breakpoint may be set for the task or function that buffers the trace information so it can be written to a file. A database of register and memory values which represent the complete history of register and memory value changes during a simulation can be created from trace information and can be (Continued)

accessed to non-intrusively obtain any processor register or memory value during simulation. The processor register and memory values of the database can also be accessed to symbolically show the behavior of ESW concurrently with hardware behavior in the simulation.

25 Claims, 5 Drawing Sheets

(56) References Cited

U.S. PATENT DOCUMENTS

| | | | |
|---|---|---|---|
| 5,881,288 A * | 3/1999 | Sumi | G06F 11/3624 714/E11.209 |
| 6,263,302 B1 * | 7/2001 | Hellestrand | G06F 11/261 703/17 |
| 6,553,513 B1 * | 4/2003 | Swoboda | G06F 11/3656 714/25 |
| 6,718,294 B1 * | 4/2004 | Bortfeld | G06F 11/3632 703/20 |
| 6,859,892 B2 | 2/2005 | Bolding et al. | |
| 7,020,768 B2 * | 3/2006 | Swaine | G06F 9/3802 712/227 |
| 7,356,679 B1 | 4/2008 | Le et al. | |
| 7,478,388 B1 | 1/2009 | Chen et al. | |
| 7,529,897 B1 | 5/2009 | Waldspurger et al. | |
| 7,917,894 B2 | 3/2011 | Chen et al. | |
| 8,271,955 B1 | 9/2012 | Lindahl | |
| 8,229,726 B1 | 10/2012 | Holmes et al. | |
| 8,473,269 B1 * | 6/2013 | Ou | G06F 17/5022 703/14 |
| 8,572,606 B1 | 10/2013 | Agesen et al. | |
| 8,683,444 B1 * | 3/2014 | Spycher | G06F 11/3636 717/125 |
| 8,780,114 B1 * | 7/2014 | Jackey | G06F 11/323 345/440 |
| 9,262,299 B1 | 2/2016 | Wilmot et al. | |
| 9,262,305 B1 | 2/2016 | Wilmot et al. | |
| 9,430,358 B1 * | 8/2016 | Thayer | G06F 11/3688 |
| 2002/0059054 A1 | 5/2002 | Bade et al. | |
| 2002/0162051 A1 | 10/2002 | Bolding et al. | |
| 2003/0028858 A1 * | 2/2003 | Hines | G06F 8/36 717/125 |
| 2003/0149961 A1 | 8/2003 | Kawai et al. | |
| 2003/0204374 A1 * | 10/2003 | Madsen | G06F 11/3466 702/186 |
| 2005/0165597 A1 * | 7/2005 | Nightingale | G06F 11/3672 703/27 |
| 2005/0289396 A1 * | 12/2005 | Hooper | G06F 11/3664 714/34 |
| 2007/0011664 A1 * | 1/2007 | Yamashita | G06F 9/455 717/135 |
| 2007/0038431 A1 * | 2/2007 | Yoon | G06F 17/5022 703/17 |
| 2007/0043531 A1 | 2/2007 | Kosche et al. | |
| 2007/0192079 A1 * | 8/2007 | Rompaey | G06F 11/3457 703/19 |
| 2007/0266376 A1 * | 11/2007 | Yim | G06F 11/3656 717/129 |
| 2008/0133897 A1 | 6/2008 | Reid et al. | |
| 2008/0319730 A1 | 12/2008 | Clark et al. | |
| 2009/0164193 A1 * | 6/2009 | McMillan | G06F 17/5022 703/13 |
| 2009/0307299 A1 | 12/2009 | Malesich et al. | |
| 2010/0153693 A1 | 6/2010 | Stall et al. | |
| 2010/0180263 A1 * | 7/2010 | Lee | G06F 11/3636 717/135 |
| 2010/0268523 A1 * | 10/2010 | Dhanwada | G06F 11/3013 703/21 |
| 2012/0089386 A1 * | 4/2012 | Kuya | G06F 17/5022 703/21 |
| 2012/0151267 A1 | 6/2012 | Bhattacharjee et al. | |
| 2012/0179447 A1 * | 7/2012 | Lin | G06F 11/3636 703/22 |
| 2013/0007720 A1 | 1/2013 | Cai et al. | |
| 2013/0111266 A1 | 5/2013 | Tosaka | |
| 2014/0052930 A1 * | 2/2014 | Gulati | G06F 11/366 711/141 |
| 2014/0181479 A1 * | 6/2014 | Sasanka | G06F 9/30098 712/220 |
| 2014/0196014 A1 | 7/2014 | Spycher et al. | |
| 2014/0298336 A1 * | 10/2014 | Taniuchi | G06F 9/455 718/1 |
| 2015/0046920 A1 | 2/2015 | Allen | |
| 2015/0248343 A1 | 9/2015 | Ionescu et al. | |
| 2015/0339214 A1 * | 11/2015 | Rozenman | G06F 11/3664 717/130 |

OTHER PUBLICATIONS

Engblom et al. "Testing Embedded Software using Simulated Hardware" Class #410, Embedded Systems Conference 2008, Silicon Valley, CA [retrieved on Apr. 13, 2019]. Retrieved from <https://pdfs.semanticscholar.org/9566/723d1b3075cd14cabc8519a24a7eaa00cd5a.pdf> (Year: 2008).*

Petrot et al. "On MPSoC Software Execution at the Transaction Level" IEEE Design and Test of Computers, vol. 28, Iss. 3, May-Jun. 2011, pp. 32-41 [retrieved on Apr. 13, 2019]. Retrieved from <https://ieeexplore.ieee.org/document/5620924> (Year: 2011).*

Willenberg et al. "Simulation-based HW/SW Co-debugging for Field-programmable systems-on-chip" 23rd International Conference on Field programmable Logic and Applications; DOI:10.1109/FPL.2013.6645542 [retrieved on Jul. 15, 2019]. Retrieved from <http://ieeexplore.ieee.org/abstract/document/6645542/> (Year: 201.*

Ghosh et al. "A Hardware-Software Co-simulator for Embedded System Design and Debugging" Proceedings of ASP-DAC'95/CHDL'95/VLSI'95 with EDA Technofair; DOI:10.1109/ASPDAC.1995.486217 [retrieved on Jul. 15, 2019]. Retrieved from <https://ieeexplore.ieee.org/document/486217> (Year: 2002).*

Willenberg et al. "Simulation-based HW/SW Co-debugging for Field-Programmable Systems-on-chip" 2013 23rd Int. Conf. on Field Prog. Logic and Apps., doi:10.1109/FPL.2013.6645542 [retrieved on Jun. 2, 2020]. Retrieved from <https://ieeexplore.ieee.org/iel7/6632515/6645482/06645542.pdf> (Year: 2013).*

Rosenberg, J., How Debuggers Work, N. Y. John Wiley, 1996, pp. 107-133. QA76.9D43 R67 1996.

Magnusson, P., et al., "SimICS/sun4m: A Virtual Workstation," Proceedings of the USENIX Annual Technical Conference, New Orleans, LA, Jun. 1998.

* cited by examiner

METHOD FOR INTERACTIVE EMBEDDED SOFTWARE DEBUGGING THROUGH THE CONTROL OF SIMULATION TRACING COMPONENTS

BACKGROUND

Aspects of the present invention relate generally to the field of system development and test, and more specifically to event-driven simulation and emulation of electronics.

Simulation of hardware components can be modeled at various levels of abstraction using event-driven simulation. Processor models in combination with hardware simulators can be used to simulate cross-compiled embedded software, for example, an operating system (OS). A collection of hardware models running such embedded software is known as a simulation platform. A simulation platform may also include models of peripherals such as memory modules, the system bus, universal asynchronous receivers (UARTs), terminals, USB devices, etc. When the environment includes processor models, it is also possible for the event-driven simulation or emulation environment to simulate the behavior of the actual cross-compiled embedded software (ESW) running on the processor models within the system.

Debugging these issues is often complicated by a simulated platform's environment limitations, which typically restrict observability and controllability of the hardware models and embedded software simulation. Additionally, applications running on top of the embedded software may create unexpected errors and require verification and testing. However, because debuggers typically run on the same operating system on which the application is being tested, this can create atypical system conditions and reduce the effectiveness of the test and debug process. Current simulators that provide for interactive debugging of ESW running on a processor model within the simulated system do not allow for non-intrusive interactive software/hardware debugging, including memory and variable viewing, without the use of special model APIs that provide for viewing memory of the processor model.

Accordingly, there is a need in the art for a system that allows non-intrusive interactive debugging to identify software and hardware issues for ESW running in a simulated system.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

A system and method are described for supporting interactive debugging of embedded software (ESW) on a simulation platform. A processor model within the simulated system will support a register and memory tracing sub-module that will not affect the processor's interactions with external hardware models. Simulator and emulator breakpoints will be used with the modeled objects within the tracing sub-module. For example, a simulator breakpoint may be set for the task or function that buffers the trace information so that it can be written to a file. The trace information can then be parsed or analyzed to create a database of register and memory values that represent the complete history of register and memory value changes during a simulation or emulation session. This database can be accessed to determine the current value of any processor register or memory value from the point of view of the processor. The information in the database can also be combined with symbolic software debugging information (e.g. Executable and Linkable Format (ELF) and Debugging With Attributed Record Formats (DWARF) compiler created files) to allow a debugger to show the value of any ESW variable accessed by the processor.

As simulation or emulation progresses, a simulator breakpoint can be used to implement ESW breakpoints or watchpoints. For ESW breakpoints, the value of a program counter (PC) register can be obtained from the trace data at a simulator breakpoint and can be compared with PC values which represent the location of user breakpoints as specified by a user for particular source lines or functions in the ESW. Similarly, memory trace data obtained at the simulator breakpoint can be compared with memory locations which correspond to ESW variable memory locations to determine if a particular ESW variable has changed value and so implement ESW watchpoints.

Figure 1:
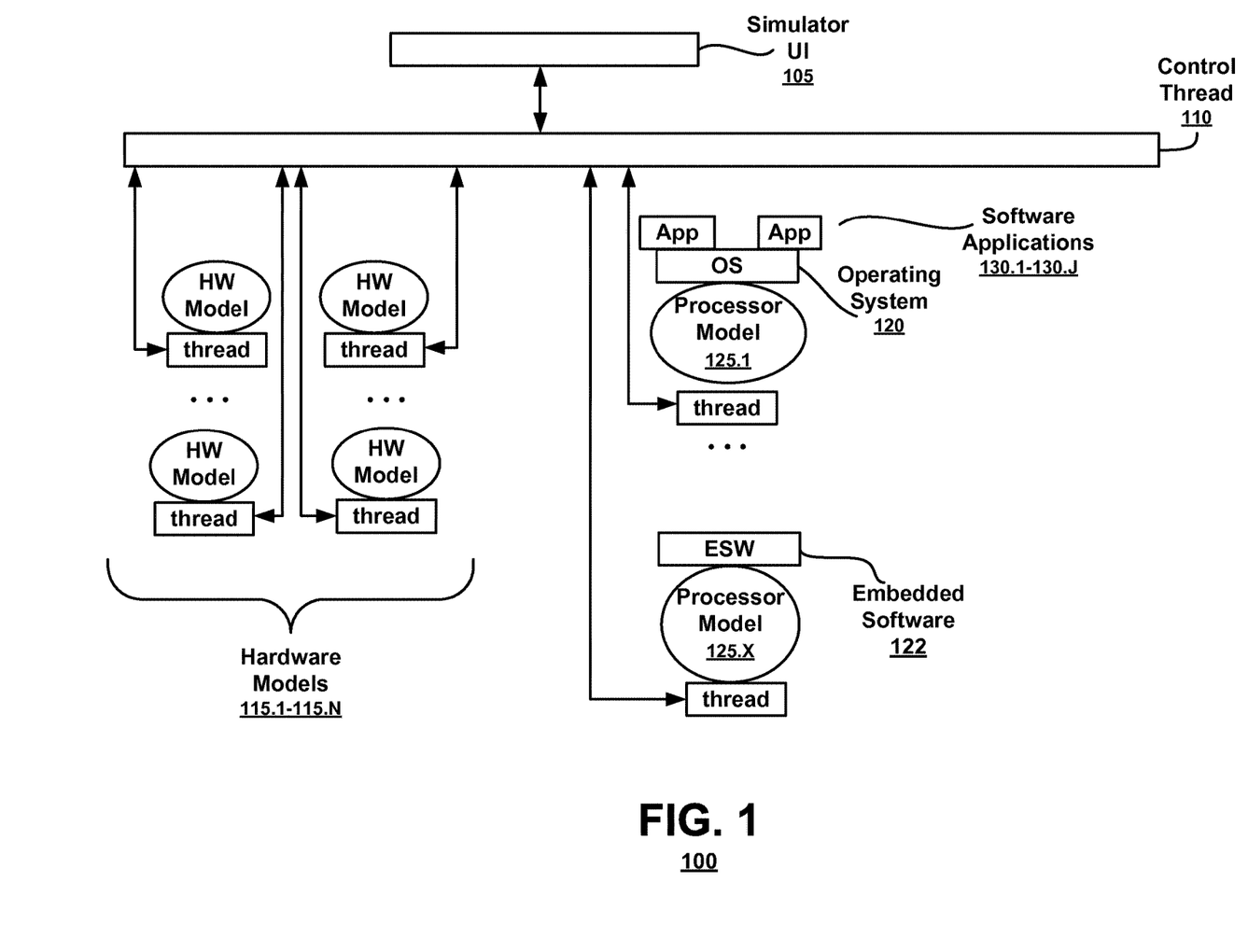
FIG. 1 illustrates an exemplary simulation platform according to an embodiment of the present invention.

FIG. 1 illustrates an exemplary simulation platform 100 according to an embodiment of the present invention. In FIG. 1, a simulator interface 105 is implemented to provide control and observability for the components of the simulation platform 100. The simulator interface 105 is executed on a control thread 110.

A modeled component as described herein refers to either a hardware component, a bare-metal software program or OS running within the context of a processor hardware component, or a process running on an OS running within the context of a processor hardware component. According to an embodiment of the present invention, the simulator platform 100 may run multiple hardware component models in sequence, with each modeled hardware component using separate host platform resources. Platform resources can include a simulator thread or process, or a call stack that is maintained for each modeled component. A simulator thread as used herein refers to a hardware component modeled within an event-driven simulator which has its own call stack context.

Simulator interface 105 runs in a control thread 110 separate from the modeled components of the simulated platform. State information and other simulation related information for the modeled components is then made available via simulation commands executed by the control thread 110 when control of the simulation returns to the control thread 110.

In FIG. 1, each modeled component is executed on a simulator thread. For example, each hardware model is executed on a simulator thread of the simulator platform. When a modeled component is executed in the course of the event driven simulation, the simulator thread for that model will become active. When a breakpoint or watchpoint in the source code implementing the modeled component is reached, the active simulator thread will yield control to the control thread 110.

Each of the modeled components of the simulation platform 100 is simulated using individual platform resources as described above. Each of the multiple modeled hardware components 115.1-115.N is executed with individual simulator threads. An OS 120 may be simulated with reference to a processor model 125.1-125.X modeling a processor running on a modeled hardware component. Each software application 130.1-130.J or application process running on the OS 120 will be executed as an OS process as necessary. Software applications 130.1-130.J may be any process or application designed to run on the OS. The simulation platform will also simulate the behavior of cross-compiled embedded software 122 running on the processor models 125.1-125.X.

According to an embodiment, interactive debugging of embedded software on the simulation platform 100 includes using a processor model that supports a register and memory tracing sub-module. A simulator breakpoint as described herein may then be set on the task or function which buffers the trace information so that the trace information can be written to a file.

Figure 2:
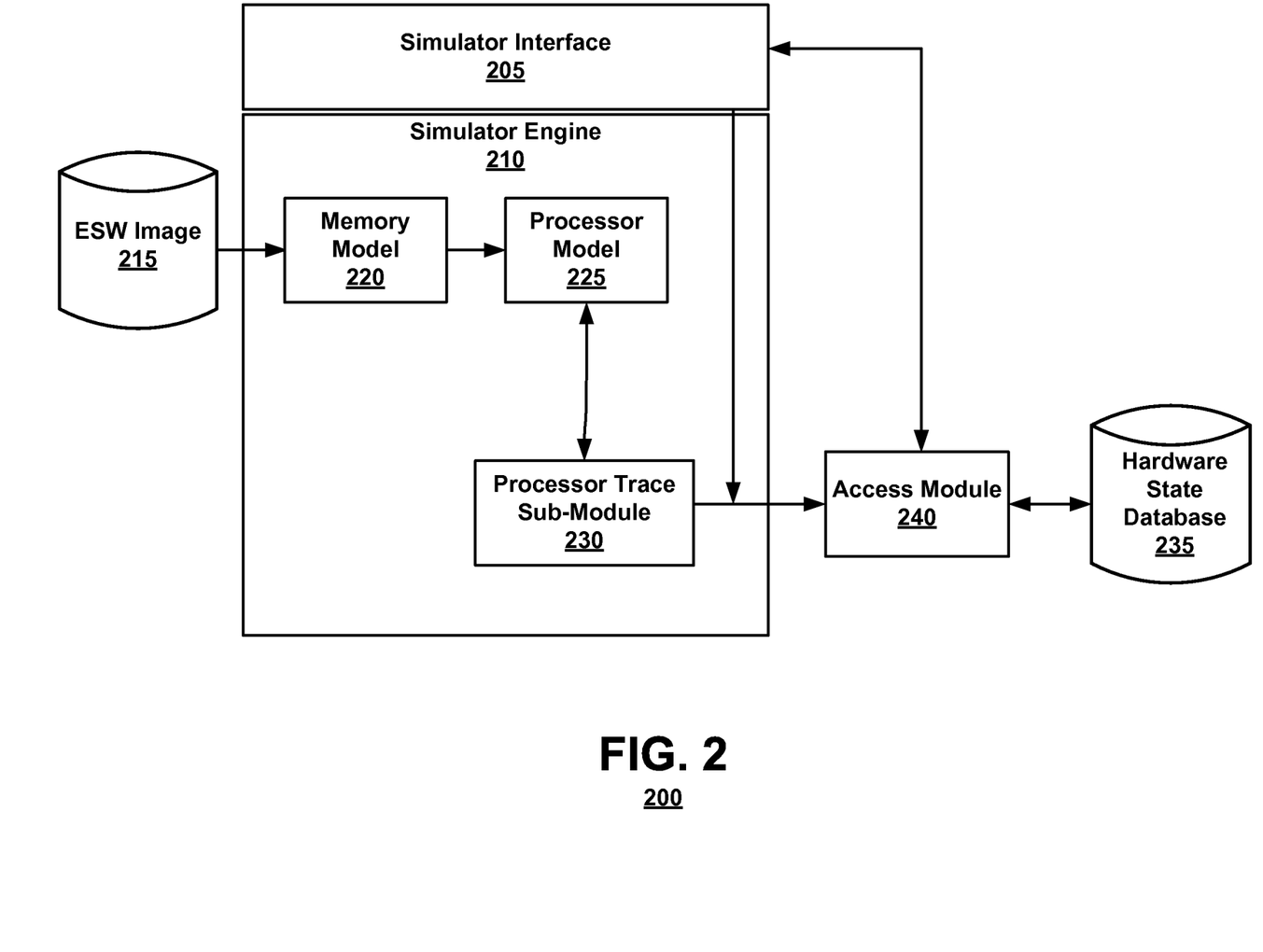
FIG. 2 is a simple block diagram illustrating components of an exemplary system according to an embodiment.

FIG. 2 is a simple block diagram illustrating components of an exemplary system according to an embodiment. As shown in FIG. 2, a simulator interface 205 is provided to execute and monitor a simulation or emulation. As described above, the simulation platform will simulate the behavior of cross-compiled embedded software running on processor models. For example, a simulator engine 210 may access an embedded software (ESW) image 215 to simulate a memory model 220 on a processor model 225. Changes in the state of a hardware element of the simulator, for example, a change to a register value, will be captured by the processor trace sub-module 230. The captured information will then be parsed and stored in a database 235 using the access module 240. Interactive simulation is supported by creating a simulation breakpoint whenever a trace is being written. A breakpoint can also be initiated by a user at the user interface 205.

Capturing trace information during simulation is more fully described in co-pending patent application Ser. No. 14/582,800 entitled "Post Simulation Debug and Analysis Using a System Memory Model," filed Dec. 24, 2014, the disclosure of which is incorporated herein by reference in its entirety.

The modeled components will produce multiple traces during simulation or emulation of the system model. The traces will then be captured. According to an embodiment, the traces could be instantiated in the form of a single file, multiple files, or the trace data could arrive in groups of messages, in a database, etc. The individual traces could even be combined into a single information stream or file.

Then, from the captured traces, a trace event can be extracted. For example, events that occur either at a specific simulation time (e.g., at time 2 ns after simulation or execution start) or that occur in a specific execution sequence (e.g., the event was the 1014th that occurred after simulation or execution commenced) can be identified.

An exemplary execution trace message may include the following information: the device or element that executed the traced action (e.g., Processor X), the action that occurred (e.g., read/write), a length or number of words or lines affected (e.g., 1 word of memory), the value of the word or line (e.g., 0x01), the address that was accessed (e.g., 0x1111212), and the time the event occurred (e.g., 2 ns). The form and contents of the trace message may vary, but should provide sufficient information to extract event information in order to create a complete and accurate view of the system memory over time.

Bus transaction traces can have many formats. For example, the format of a bus trace can vary depending on the standard and system producing the trace, (e.g. the TLM 2.0 standard, ARM Tarmac Memory Bus Trace, etc.). However, a bus trace should include the following information: the initiator or master device that generated the bus transaction, the target or slave device that provides the information requested by the bus transaction, a mode such as read, write, read/write, etc., a time when the transaction occurred, the length of bytes that were requested, the address of the data that was written or read, and the data that was read or written. An exemplary bus trace message (simplified and expressed in human readable form) could be "Device dev1 reads 4 bytes of memory receiving value 0x20 from address 0x122211 of target device memory1 at time 23 ns". The form and contents of the trace message may vary, but should provide sufficient information to extract event information to contribute to a complete and accurate view of the system memory over time.

Similarly, a register trace message may include the device that interacted with the register (e.g., device dev1), the register that was affected (e.g., register R0), the value the register was changed to (e.g., 0x0), and the time the event occurred (e.g., 2 ns). The form and contents of the trace message may vary, but should provide sufficient information to extract event information to contribute to a complete and accurate view of the system memory over time.

When an execution trace parser parses out a message that either shows a memory value that it retrieved by reading from a memory or by writing a value to memory the parser commits the trace to the database 235. When a bus transaction trace parser parses out a bus transaction, it first determines whether the target device is a memory being tracked in the database 235. If it is, the value that was either written or read is committed to the database 235. Bus transactions for target devices not being tracked may be ignored.

When a peripheral register trace parser parses out a register value change, it first uses a memory map to find out which address in physical memory should be updated when the register changes value. Then the value that was either written or read is committed to the database 235 by the access module 240 using the address determined from the memory map.

A memory device such as a database 235 stores a representation of the system memory as a function of time. The database supports read and write operations. For example, an exemplary readMemory command may have the following inputs: a base address in memory, a length, and a time value. The readMemory command will then return the data from memory that was present at the provided value time. The time value may represent simulation time, execution time, sequence, etc. The readMemory command will return either a value that was recorded from the received traces or zero if no trace operation involving the given memory address was discovered during trace parsing. An exemplary writeMemory command will include a base address, a length, a time value, and a data value that will be written to the database. According to an embodiment, the database 235 is a temporal database. Consequently, if no trace event occurred at the precise moment of time requested by the input time value, the database 235 will retrieve the value that was last set by reviewing earlier moments in time to identify the last event that affected that memory (if there was one). According to an embodiment, the database 235 could be implemented as a temporal sparse matrix or a three dimensional matrix.

According to an embodiment, a representation of ESW data structures and entry points will be accessible via the access module 240 in communication with the memory database 235. For example, a Program Counter (PC) register value can be stored that represents a function in the embedded software that switches between processes. This information may be captured and stored in the database. The PC register will be monitored during simulation of the system model and when the value of the PC register changes, a breakpoint, watchpoint, register event, transaction, or other change is detected and a trace will be stored to the database. Information relevant to the simulation can later be retrieved from the database 235 using the access module 240 and presented to the user via the simulator interface 205.

According to an embodiment, breakpoints may be entered manually via the simulation interface by a user during interactive debug operations.

Figure 3:
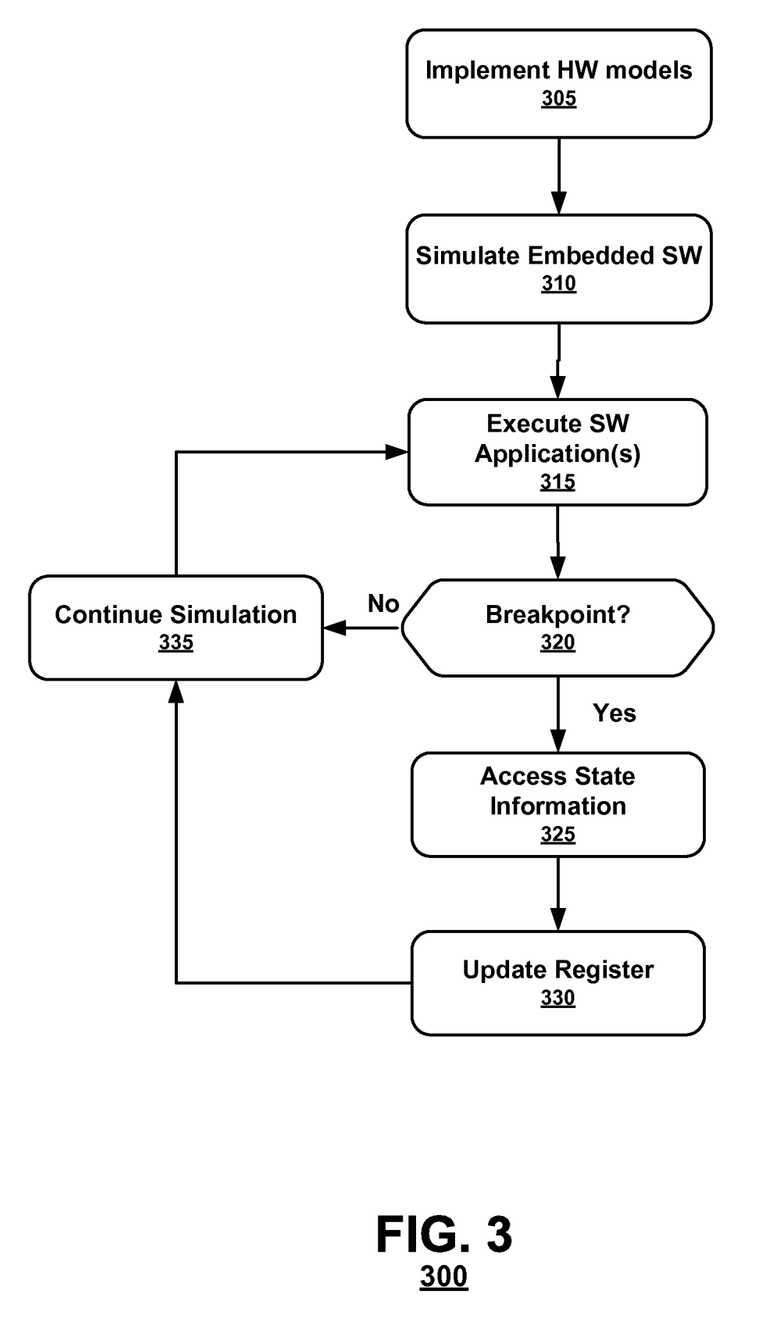
FIG. 3 illustrates an exemplary method for simulating embedded software components implemented on a simulation platform according to an embodiment of the present invention.

FIG. 3 illustrates an exemplary method 300 for simulating embedded software components implemented on a simulation platform according to an embodiment of the present invention. As shown in FIG. 3, to simulate a system including hardware models, embedded software, and software applications running on the embedded software, one or more hardware models may be implemented (block 305). Additionally, one or more embedded software applications may be simulated, for example by using a processor model (block 310). Then, one or more high-level software applications may be executed with the simulated embedded software (block 315). The simulation may step sequentially through the execution of each high-level software application, embedded software application, and hardware model as necessary to run the high-level application, thereby simulating an event-driven system.

During execution, if the source code for any component reaches a breakpoint, a watchpoint, or other stop point (e.g. an error) (block 320), control of the simulation will transfer to a control thread. The control thread will then allow a controller or event manager of the system to access state information of one or more modeled components or other information, or otherwise execute an additional command as part of the debug and verification process (block 325). This transition of control will be captured in the PC register (block 330). The change in the register value will be captured with a register trace and stored in the hardware state database (not shown). Then, during debug or analysis operations, the register changes can be queried via the hardware state database to identify a change in value that represents a breakpoint.

Once the conditions of the breakpoint have been handled, the simulation may return to the simulator thread that was executing when the breakpoint was reached or otherwise continue the simulation by sequentially stepping through the application procedures (block 335).

The insertion or creation of complex breakpoint conditions within a simulation platform is described in further detail in co-pending U.S. patent application Ser. Nos. 13/907,516, 13/907,474, and 13/907,566, the disclosures of which are incorporated herein by reference in their entirety.

According to an embodiment of the present invention, to facilitate stepping through the source code of the modeled components implemented in a simulator platform, the system may insert breakpoints at certain common actions as described above. For a simulator running multiple hardware models in sequence with each model having a separate simulator execution thread, hardware stepping yields control from the simulator threads associated with individual models back to the control thread after a predetermined number of source lines of the model have been executed. Objects representing hardware elements may be updated as the simulator progresses, which updates may be captured in trace statements that are parsed and stored in the hardware state database.

Similarly, software stepping yields execution control from the embedded software to the control thread after a predetermined amount of software source code has been executed. When a stepping operation to cross the software and hardware domains so that either the next software or hardware source code line, as appropriate, will be executed in sequence before returning to the control thread, the transition will be recorded, for example in the PC register. Then during debug the register changes can be queried via the database.

Inserting breakpoints to facilitate stepping between domains in the simulated platform is further described in the aforementioned co-pending U.S. Patent Applications.

Figure 4:
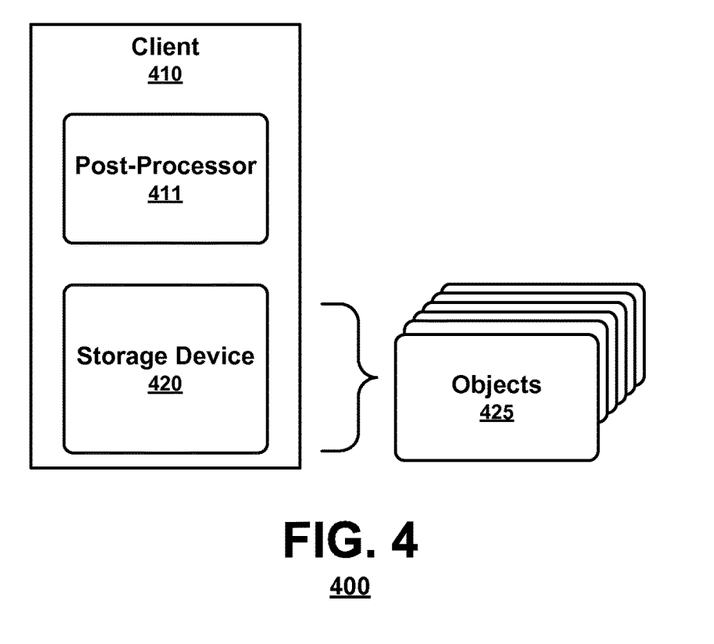
FIG. 4 is a simple block diagram illustrating components of an exemplary system according to an embodiment.

A user may access a simulation platform interface in a standalone client system, client-server environment, or a networked environment. FIG. 4 is a simple block diagram illustrating components of an exemplary system 400 according to an embodiment. As shown in FIG. 4, a system 400 may comprise a client 410 executing a simulator platform 411 and having a memory storage 420. The client 410 may be any computing system that executes a simulator platform 411 or otherwise facilitates access to memory storage 420, for example a personal computer. The client 410 may include a processor that performs a method in accordance with the disclosed embodiments. Such a client would be part of an overall simulation system in accordance with the disclosed embodiments.

Hardware models, instruction sets, software packages, the database, and other objects 425 used by the simulation system may be stored in memory storage 420. A user may access the objects 425 stored in memory storage 420 with the client 410 via a simulator platform interface, where the simulator platform interface is capable of accessing memory storage 420 and displaying the objects 425 and the data associated with the simulation. The simulator platform interface may include a user interface, for example a program, application or middleware that acts as a frontend to and facilitates access to objects in memory storage 420. The simulator platform interface may facilitate control over and observability into the simulation of the components implemented in a simulator platform using the tools and procedures described herein. The user may interact with the post-processing interface through a number of input devices, such as by inputting a selection as with a mouse or inputting a request as with a keyboard. The user may observe the simulation results on an output device or display. The simulator platform interface may run in an application window controlled by the user.

According to an embodiment, wherein said simulating of the modeled components facilitates the manufacture of one or more components, including component implementing embedded software.

As shown in FIG. 4, a client 410 may be a stand-alone system, as may be of particular interest where the components simulated are highly confidential. Additionally, according to an aspect of an embodiment as shown in FIG. 5, a client 510 may be part of a networked environment.

Figure 5:
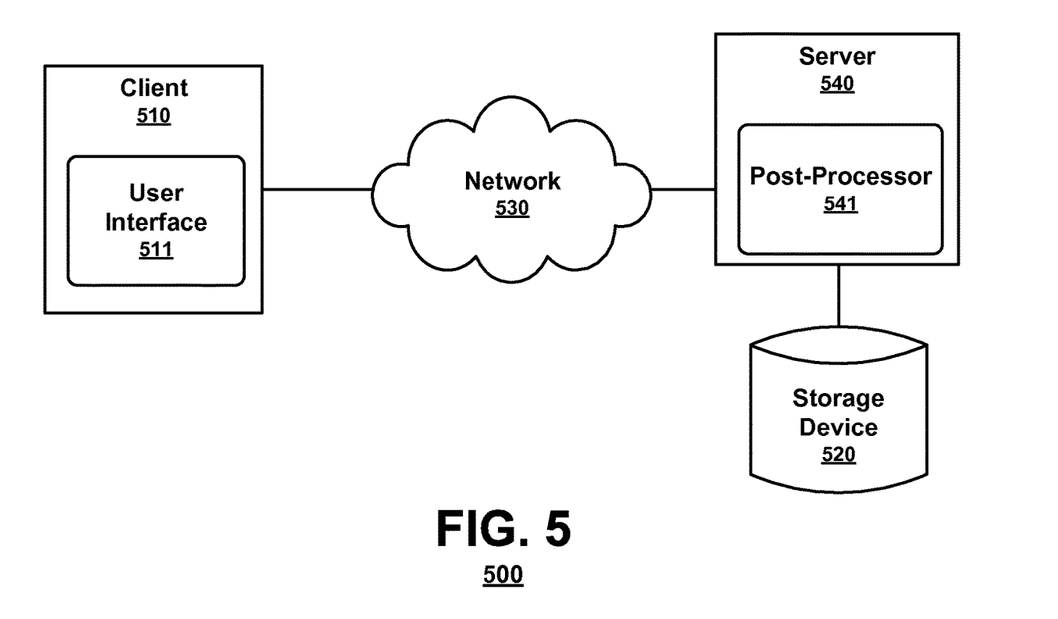
FIG. 5 is a simple block diagram illustrating components of an exemplary system according to an embodiment.

FIG. 5 is a simple block diagram illustrating components of an exemplary system 500 according to an embodiment. As shown in FIG. 5, system 500 may include a client 510 having a user interface 511. The client 510 may be connected to a server 540 via a network 530. The simulator platform 541, which in this embodiment is located at server 540, may have access to storage device 520 storing hardware models, instruction sets, software packages, a database, and other objects utilized by the simulation system. The server 540 may include a processor that performs a method in accordance with the disclosed embodiments. Such a server then would be part of the overall simulation system in accordance with the disclosed embodiments.

A user may access a simulator platform 541 at the server 540 via the client 510 having a user interface 511 capable of accessing and displaying the components implemented as part of a simulator platform and the simulation of those components. The client 510 may be any computing system that facilitates the user accessing storage device 520, for example a personal computer. The network 530 may be a wired or wireless network that may include a local area network (LAN), a wireless area network (WAN), the Internet, or any other network available for accessing storage device 520 from the client 510.

The server 540 may be a network server accessible to the client 510 via the network 530 that may manage access to storage device 520. The user interface 511 may receive instructions regarding analyzing a simulation from the user and utilizing the objects stored in memory storage 520, facilitate a display of the simulation results queried from the described databases. Multiple different clients (not shown) may access storage device 520 via the network 530 and request access to the objects stored therein.

In another networked environment, the simulator platform may be executed on a network capable client and access the other objects stored in one or more storage devices via a network and communications server.

Figure 6:
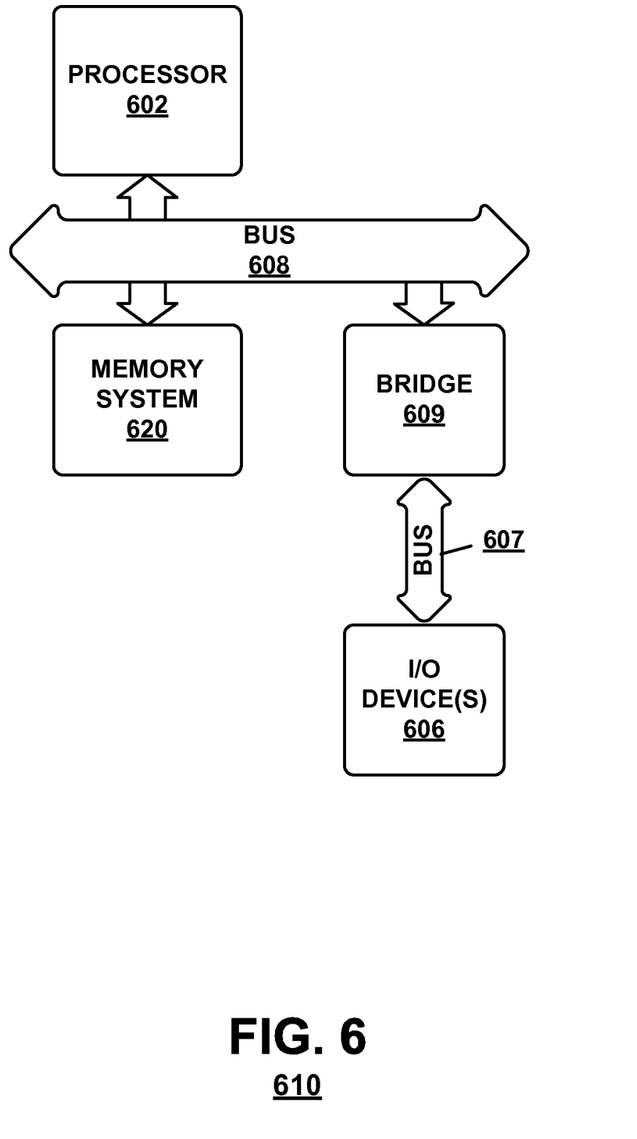
FIG. 6 is a simple block diagram illustrating components of an exemplary client according to an embodiment of the present invention.

FIG. 6 is a simple block diagram illustrating components of an exemplary client 610 according to an embodiment of the present invention. As shown in FIG. 6, the client 610 configured to execute the simulator platform as described herein may include a processor 602, a memory system 620 and one or more input/output (I/O) devices 606 in communication. The communication can be implemented in a variety of ways and may include one or more computer buses 607, 608 and/or bridge devices 609 as shown in FIG. 6. The I/O devices 606 can include network adapters and/or mass storage devices from which the client 610 can receive commands for executing the simulation.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, the arrangement of the blocks in FIG. 3 do not necessarily imply a particular order or sequence of events, nor are they intended to exclude other possibilities. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method comprising:
   simulating a processor model representative of a processor and a hardware model representative of a hardware element, wherein each of the processor model and the hardware model are executed with a corresponding simulator thread on a simulation platform;
   simulating embedded software using the processor model, wherein the simulating comprises updating a given register of the processor model that stores a value that changes in response to switching between processes within the embedded software;
   transferring control of the simulation of one of the processor model and the hardware model to a control thread from the corresponding simulator thread in response to the given register changing, wherein upon transferring control of the simulation of one of the processor model and the hardware model, the simulation of one of the hardware model and the processor model is suspended;
   capturing a change of state in the given register of the processor model with a trace sub-module of the processor model, wherein the change of state in the given register is representative of the transferring of the control of the simulation of one of the processor model and the hardware model to the control thread from the corresponding simulator thread in response to the given register changing; and
   storing the captured change of state in the given register in a database for debugging of the embedded software, wherein the debugging of the embedded software comprises querying the database to identify the switching between the processes within the embedded software based on the captured change of state in the given register.

2. The method of claim 1, further comprising setting a simulator breakpoint, wherein the change of state in the given register is captured at the simulator breakpoint.

3. The method of claim 2, wherein the simulator breakpoint is set on a function that buffers the change of state in the given register.

4. The method of claim 2, further comprising setting a software breakpoint at the function that switches between processes within the embedded software.

5. The method of claim 4, further comprising updating the given register at the software breakpoint in the embedded software, the given register is a program count (PC) register.

6. The method of claim 5, further comprising monitoring the PC register during the simulating of the embedded software using the processor model, and for each change in state to the PC register, triggering the simulator breakpoint.

7. The method of claim 2, further comprising a simulation interface, wherein the simulator breakpoint is inserted based on user input received via the simulation interface.

8. The method of claim 1, further comprising accessing the database to identify a specific variable.

9. The method of claim 8, further comprising detecting a change to the specific variable.

10. The method of claim 9, further comprising inserting a simulator breakpoint upon detection of the change of state in the given register.

11. A system comprising:
  a memory storing machine-readable instructions comprising a plurality of component models comprising a processor model representative of a processor and a hardware model representative of a hardware element, embedded software for execution using the processor model during a simulation of the plurality of component models; and
  a processor configured to access the memory and execute the machine-readable instructions, the machine-readable instructions causing the processor to:
    simulate the processor model representative of the processor and the hardware model representative of the hardware element, wherein each of the processor model and the hardware model are executed by the processor with a corresponding simulator thread;
    simulate the embedded software using the processor model, wherein the simulating comprises updating a given register of the processor model that stores a value that changes in response to switching between processes within the embedded software;
    transfer control of the simulation of one of the processor model and the hardware model to a control thread from the corresponding simulator thread in response to the given register changing, wherein upon transferring control of the simulation of one of the processor model and the hardware model, the simulation of one of the hardware model and the processor model is suspended;
    capture a change of state in the given register of the processor model with a processor trace sub-module of the processor model, wherein the change of state in the given register is representative of the transferring of the control of the simulation of one of the processor model and the hardware model to the control thread from the corresponding simulator thread in response to the given register changing;
    parse the captured change of state in the given register; and
    store the captured change of state in the given register in a database in the memory based on the parsing for post-simulation debugging of the embedded software, wherein the post-simulation debugging of the embedded software comprises querying the database to identify the switching between the processes within the embedded software based on the captured change of state in the given register.

12. The system of claim 11, wherein the processor is further configured to set a simulator breakpoint, wherein the change of state in the given register is captured at the simulator breakpoint.

13. The system of claim 12, wherein the processor is further configured to set the simulator breakpoint on a function that buffers the change of state in the given register.

14. The system of claim 12, wherein the processor is further configured to set a software breakpoint at the function that switches between processes within the embedded software.

15. The system of claim 14, wherein the processor is further configured to update the given register at the software breakpoint in the embedded software, the given register is a program counter (PC) register.

16. The system of claim 15, wherein the processor is further configured to monitor the PC register during the simulating of the embedded software using the processor model, and for each change in state to the PC register triggering a simulator breakpoint.

17. The system of claim 12, further comprising a simulation interface, wherein the simulator breakpoint is inserted based on user input received via the simulation interface.

18. The system of claim 11, wherein the processor is further configured to access the database to identify a specific variable.

19. The system of claim 18, wherein the processor is further configured to detect a change to the specific variable.

20. The system of claim 19, wherein the processor is further configured to insert the simulator breakpoint upon detection of the change of state in the given register.

21. The method of claim 1, further comprising transferring control of the simulation of one of the processor model and the hardware model from the control thread to the corresponding simulator thread that was executing the simulation of one of the processor model and the hardware model in response to storing the captured change of state in the given register in the database.

22. The method of claim 21, wherein upon transferring control of the simulation of one of the processor model and the hardware model from the control thread to the corresponding simulator thread, the simulation of one of the hardware model and the processor model is resumed.

23. The method of claim 1, further comprising simulating an execution of one or more software applications with the simulated embedded software, wherein the simulation sequentially steps through the execution of the one or more software applications, the embedded software and the processor model to run the one or more software applications.

24. The method of claim 23, wherein the simulating facilitates a manufacture of a system that includes the hardware element and the processor and the embedded software.

25. The system of claim 11, wherein the machine-readable instructions further cause the processor to:
  transfer control of the simulation of one of the processor model and the hardware model from the control thread to the corresponding simulator thread that was executing the simulation of one of the processor model and the hardware model in response to storing the captured change of state in the given register in the database; and resume the simulation of one of the hardware model and the processor model in response to the transferring.

* * * * *